US012555963B2

(12) United States Patent
Kim et al.

(10) Patent No.: US 12,555,963 B2
(45) Date of Patent: Feb. 17, 2026

(54) BUSBAR UNIT FOR HYBRID VEHICLE

(71) Applicants: MAHLE DONGHYUN FILTER SYSTEMS CO., LTD, Gyeonggi-do (KR); MAHLE International GmbH, Stuttgart (DE)

(72) Inventors: Daejung Kim, Gyeonggi-do (KR); Kihyun Kim, Gyeonggi-do (KR)

(73) Assignees: MAHLE DONGHYUN FILTER SYSTEMS CO., LTD, Gyeonggi-Do (KR); MAHLE INTERNATIONAL GMBH, Stuttgart (DE)

( * ) Notice: Subject to any disclaimer, the term of this patent is extended or adjusted under 35 U.S.C. 154(b) by 346 days.

(21) Appl. No.: 18/255,847

(22) PCT Filed: Dec. 3, 2021

(86) PCT No.: PCT/KR2021/018186
§ 371 (c)(1),
(2) Date: Jun. 2, 2023

(87) PCT Pub. No.: WO2022/119370
PCT Pub. Date: Jun. 9, 2022

(65) Prior Publication Data
US 2024/0006832 A1 Jan. 4, 2024

(30) Foreign Application Priority Data

Dec. 3, 2020 (KR) .................. 10-2020-0167502

(51) Int. Cl.
*H01R 25/16* (2006.01)
*H01R 9/26* (2006.01)
(Continued)

(52) U.S. Cl.
CPC ......... *H01R 25/162* (2013.01); *H01R 9/2691* (2013.01); *H01R 13/655* (2013.01); *H01R 13/6596* (2013.01); *H01R 2201/26* (2013.01)

(58) Field of Classification Search
CPC .. H01R 25/162; H01R 9/2691; H01R 13/655; H01R 2201/26; H01R 13/6596; H01R 13/6592; H01R 13/6593; H01R 13/6595
See application file for complete search history.

(56) References Cited

U.S. PATENT DOCUMENTS 9,208,922 B2 * 12/2015 Yoshida ............. H01R 13/6596
9,407,027 B2 * 8/2016 Yoshida ............... H01R 13/504
10,181,689 B2 * 1/2019 Kobayashi ............ H02G 5/007

FOREIGN PATENT DOCUMENTS

DE 202009016954 U1 * 3/2010 ........... H01R 13/655
JP 2002296459 A 10/2002
(Continued)

OTHER PUBLICATIONS

Applicant: Mahle Donghyun Filter Systems Co., LTD; Korean International Application No. PCT/KR2021/018186 Filed: Dec. 3, 2021; International Search Report; Mar. 23, 2022; 4 pgs.

*Primary Examiner* — Renee S Luebke
*Assistant Examiner* — Paul D Baillargeon
(74) *Attorney, Agent, or Firm* — Tarolli, Sundheim, Covell & Tummino LLP

(57) ABSTRACT

A busbar unit for a hybrid vehicle includes an integrally formed housing part. The busbar unit also includes contact terminal parts which are installed at an inner side of the housing part. The busbar unit further includes a connector part which is coupled to a front surface of the housing part to be electrically connected to the contact terminal parts. The busbar unit yet further includes a coupling member which is coupled to the connector part via the contact terminal parts at a lower side of the housing part. The busbar unit includes (Continued)

a grounding bracket including one end fixed to a front surface of the connector part and the other end extending toward a seating surface for electrical grounding to the seating surface of a motor cover where a bottom surface of the housing part is seated.

8 Claims, 9 Drawing Sheets

(51) Int. Cl.
*H01R 13/655* (2006.01)
*H01R 13/6596* (2011.01)

(56) References Cited

FOREIGN PATENT DOCUMENTS

| JP | 2013-026078 A | 2/2013 |
|---|---|---|
| JP | 2015-012026 A | 1/2015 |
| JP | 2019-212583 A | 12/2019 |
| KR | 200162010 Y1 | 12/1999 |
| KR | 10-2009-0105057 A | 10/2009 |

\* cited by examiner

[FIG. 1]
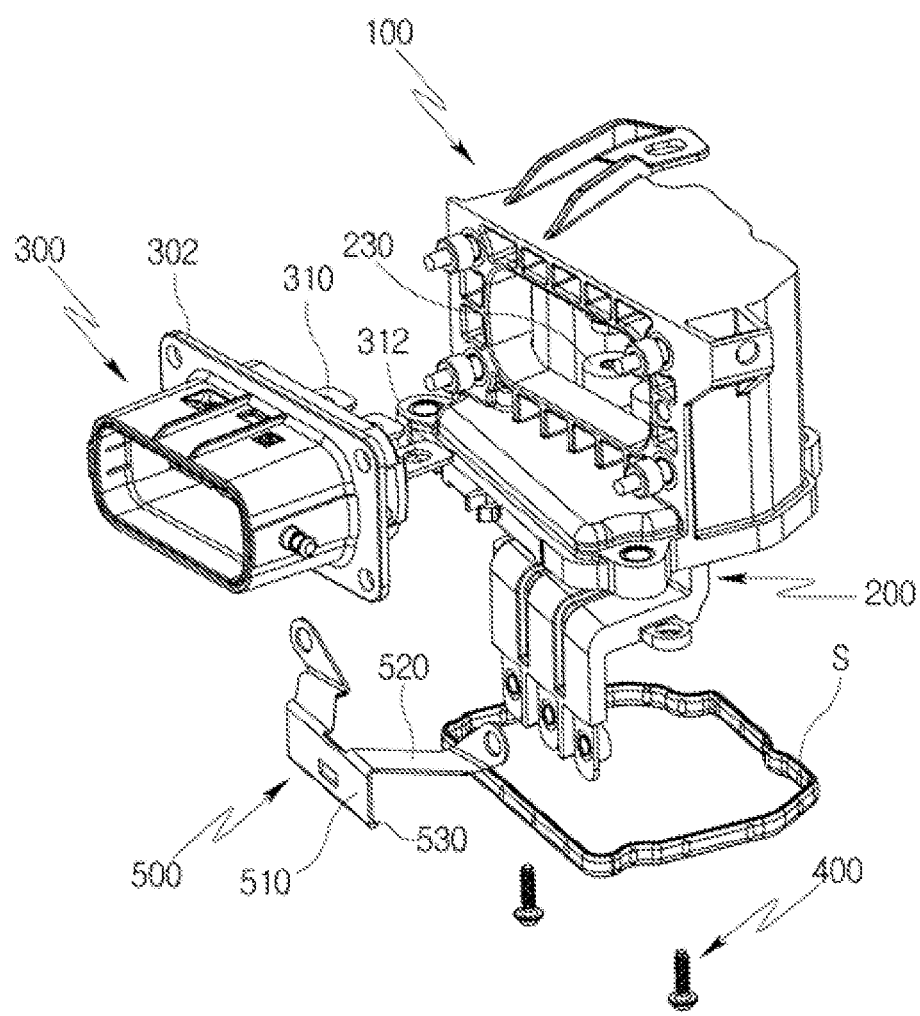

[FIG. 2]
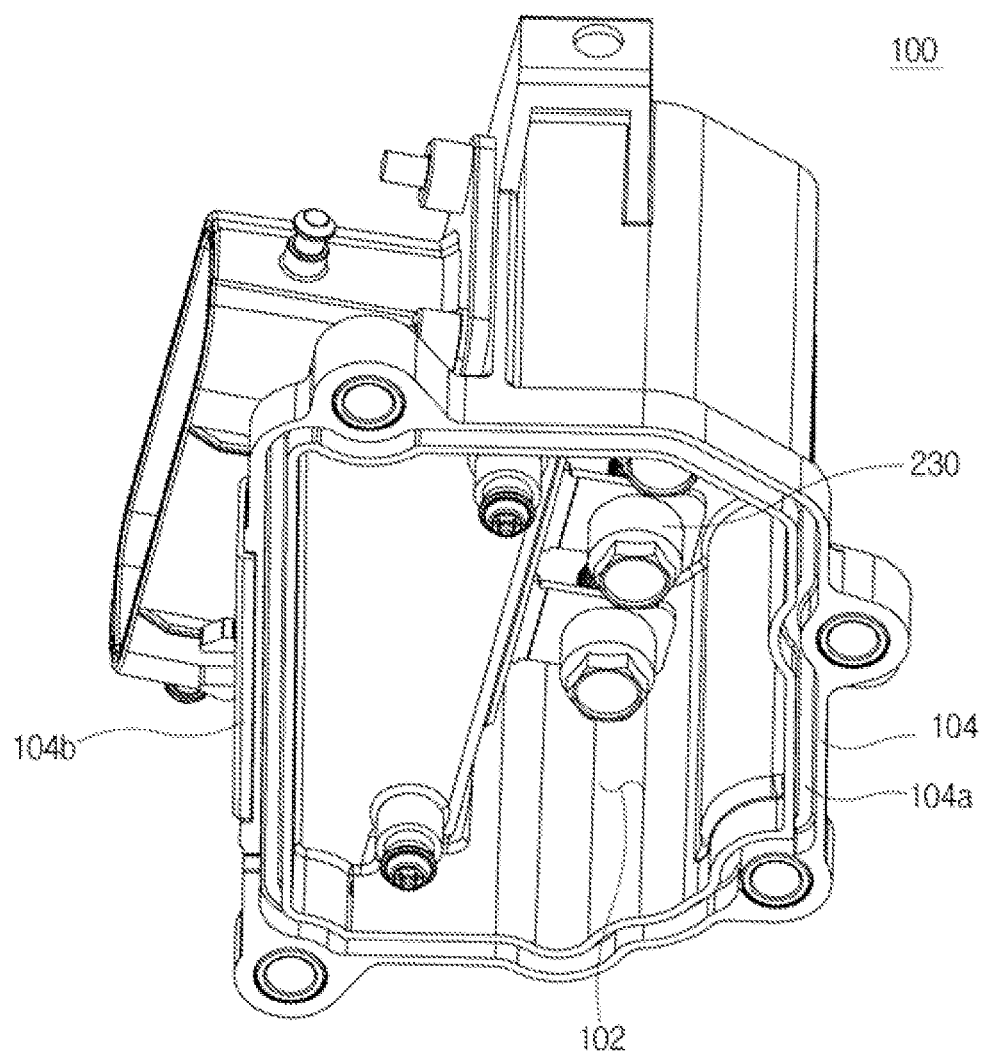

【FIG. 3】
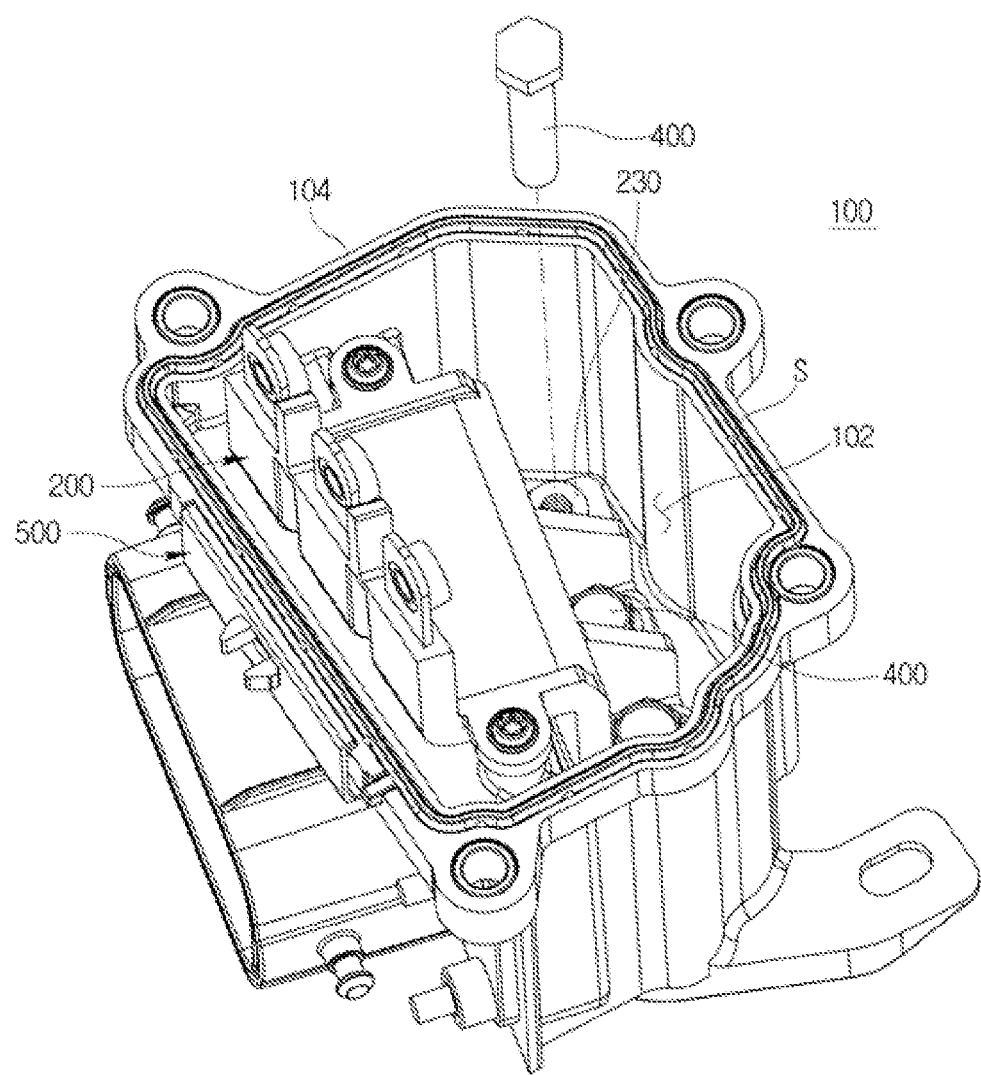

[FIG. 4]
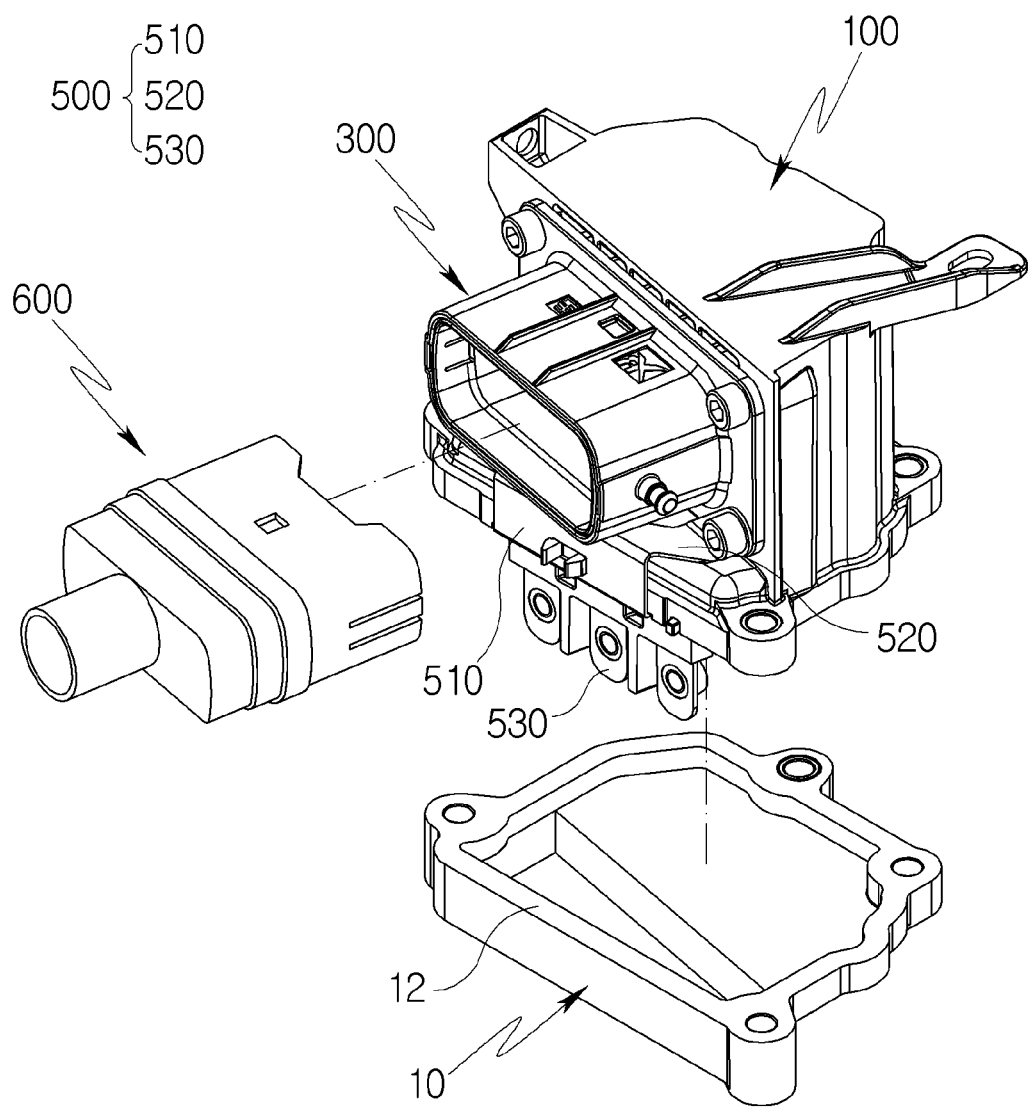

[FIG. 5]
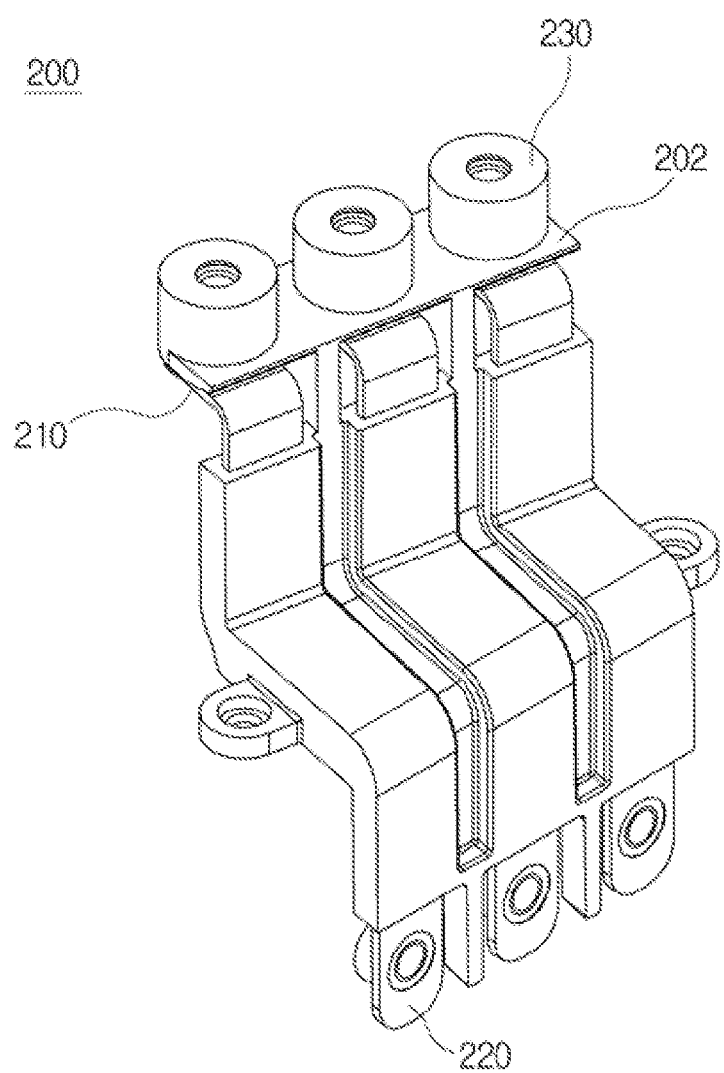

【FIG. 6】
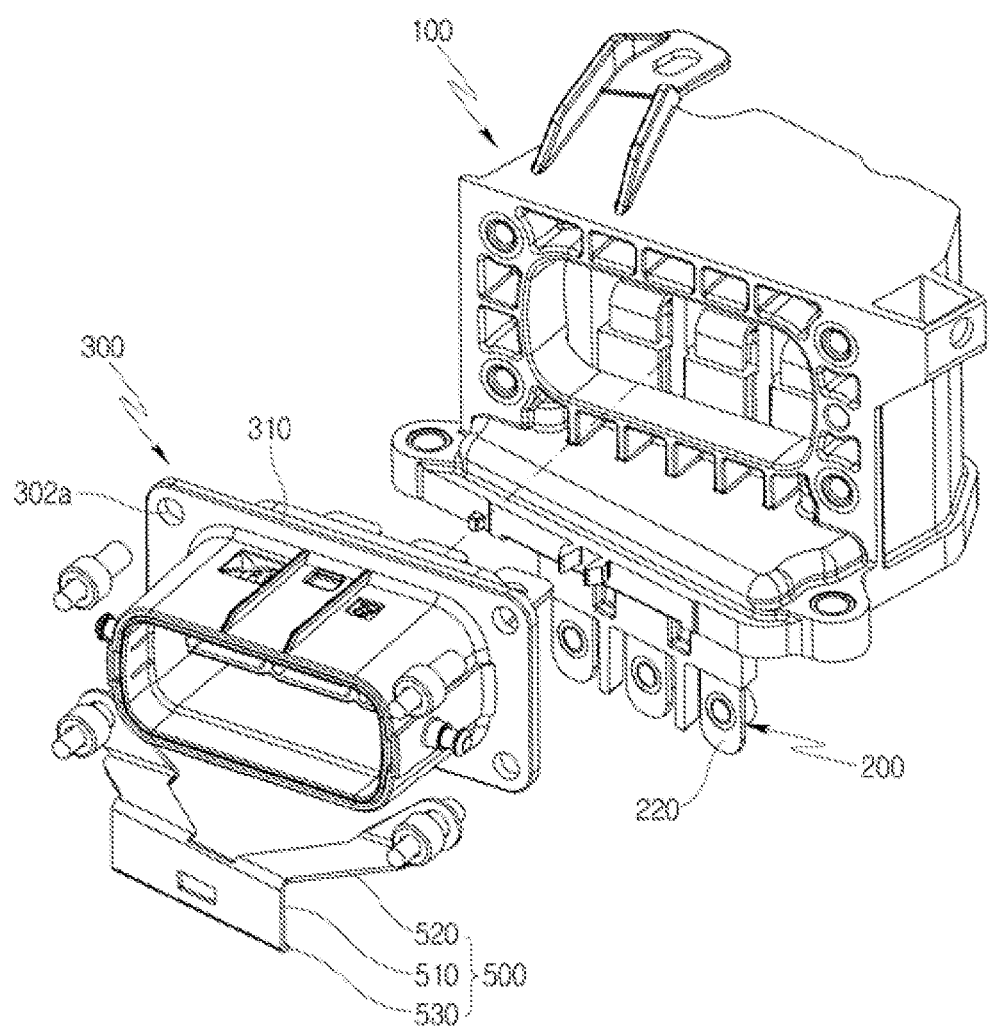

[FIG. 7]
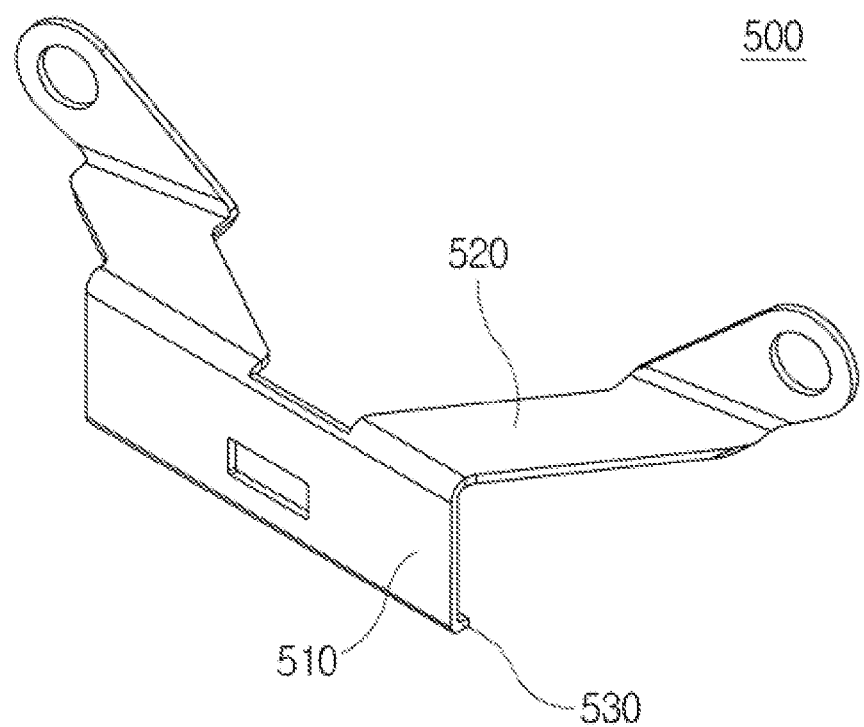

[FIG. 8]
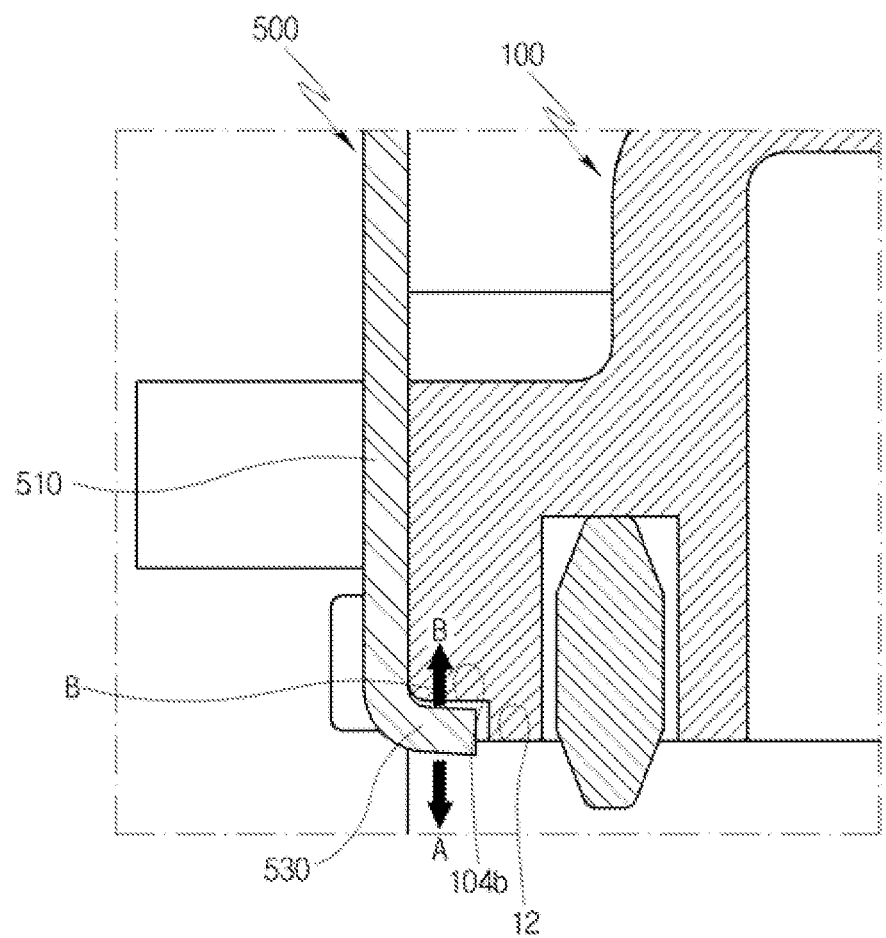

【FIG. 9】
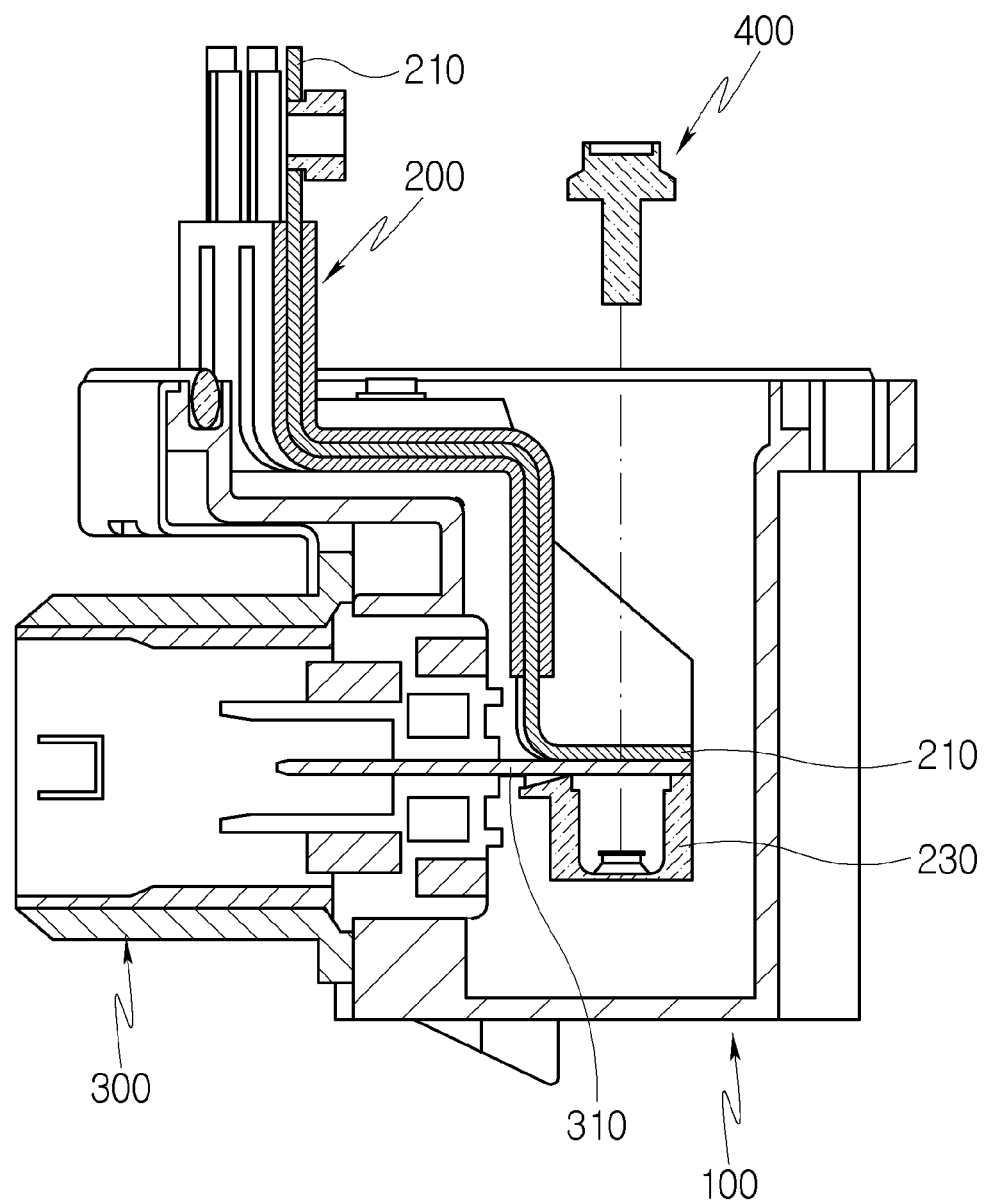

BUSBAR UNIT FOR HYBRID VEHICLE

CROSS-REFERENCE TO RELATED APPLICATIONS

This application is a U.S. National Stage Application filed under 35 U.S.C. § 371 of PCT/KR2021/018186, filed Dec. 3, 2021, and entitled "BUSBAR UNIT FOR HYBRID VEHICLE", which claims priority from Korean Patent Application No. 10-2020-0167502, filed on Dec. 3, 2020. The entire contents of each of the above-identified patent applications are incorporated herein by reference.

TECHNICAL FIELD

The present invention relates to a busbar unit for a hybrid vehicle which is improved in the assembly method.

BACKGROUND ART

In general, electric vehicles have been actively studied because they are the most promising solution to vehicle pollution and energy problems.

Hybrid electric vehicles (HEVs) use an engine of an internal combustion engine and a motor using power from a battery as a power source. Electric vehicles (EVs) are vehicles that are mainly powered by an AC or DC motor using power of a battery, and are broadly classified into battery powered electric vehicles and hybrid electric vehicles. In the battery powered electric vehicles, a motor is driven using power of a battery.

For example, when the power is consumed, it is recharged, and in hybrid electric vehicles, a battery is charged with electricity generated via engine driving, and an electric motor is driven using the electricity to realize vehicle movement.

In the hybrid electric vehicles, a motor unit is installed between an engine and a transmission, and a busbar module for electrical connection is installed in the motor unit.

The busbar module is configured to be divided into a lower housing and an upper housing, respectively, and the upper housing is fixed to the upper side of the lower housing by vibration welding.

In a conventional busbar module, contact pins are provided on the inside of a lower housing, and connectors electrically connected to the contact pins are first inserted from the outside to inside of the lower housing.

After the upper housing is coupled to the lower housing, an assembly is performed using a vibration welding method.

The conventional busbar module assembled in this way has a complicated assembly process and deformation of the lower housing or upper housing may occur during vibration welding, so improvement is required.

DOCUMENTS OF RELATED ART

Patent Document (Patent Document 1) KR Patent Application Publication No. 10-2015-0052611

DISCLOSURE

Technical Problem

Embodiments of the present invention are to provide a busbar unit for a hybrid vehicle in which assembly is simple and noise generation is reduced.

Technical Solution

A busbar unit for a hybrid vehicle according to the present embodiment comprises an integrally formed housing part 100; a plurality of contact terminal parts 200 which is installed at an inner side of the housing part 100, a connector part 300 which is coupled to a front surface of the housing part 100 to be electrically connected to the contact terminal parts 200; a coupling member 4X which is coupled to the connector part 300 via the contact terminal parts 200 at a lower side of the housing part 100, and a grounding bracket 500 including one end fixed to a front surface of the connector part 300 and the other end extending toward a seating surface 12 for electrical grounding to the seating surface 12 of a motor cover 10 where a bottom surface of the housing part 100 is seated.

The housing part 100 includes an insertion portion 102 with an open lower side and a housing contact portion 104 which faces and makes surface contact with the seating surface 12 along an edge of the insertion portion 102, the housing contact portion 104 includes a sealing groove portion 104a into which a sealing member (S) provided for sealing with the motor cover 10 is inserted and a ground groove portion 104b stepped inward to allow the other end of the grounding bracket 500 to be inserted.

The ground groove portion 104b extends a predetermined length along a horizontal direction of the housing part 100.

The contact terminal part 200 includes a plurality of first contact terminals 210 which is electrically contacted with the connector part 300; a plurality of second contact terminals 220 which is bent and extended from the plurality of first contact terminals 210 toward the lower side of the housing part 100 a plurality of times and is positioned inside the motor cover 10; and a plurality of nuts 230 which is integrally formed with the plurality of first contact terminals 210 and has a tap hole screwed into the coupling member 400.

The connector part 300 includes a connector terminal portion 310 which extends a predetermined length toward an outside of a connector body 302 constituting an overall appearance; a bolting hole 302a which is formed at a corner position of the connector body 302.

The grounding bracket 500 includes a front portion 510 which is positioned at a center of the front surface of the housing part 100; a branching portion 520 which is branched from the front portion 510 to both left and right sides toward the front surface of the connector part 300; and a bent portion 530 which is bent from the front portion 510 toward the housing part 100.

The front portion 510 has relatively wider width and area than those of the branch portion 520.

When an end of the bent portion 530 extends obliquely downward toward the seating surface 12 and the bent portion 430 is in surface contact with the seating surface 12, a contact state is maintained while a predetermined tension is applied to the seating surface 12.

In the state where the insertion portion 102 of the housing part 100 is positioned vertically upward, the coupling member 400 is coupled in a direction from an upper side to an lower side.

Advantageous Effects

In the embodiments of the present invention, since the busbar unit for a hybrid vehicle is integrally molded by injection molding, it is possible to assemble the connector parts without using the vibration welding method, thereby reducing the additional work of workers and simplifying the assembly work.

In the present embodiments, convenience is improved by facilitating assembly of the contact terminal part and the connector part, and electrical grounding force and noise generation are prevented through a deformed grounding bracket.

DESCRIPTION OF DRAWINGS

FIG. 1 is an exploded perspective view of a busbar unit for a hybrid vehicle according to an embodiment.

FIG. 2 is a bottom perspective view of a housing part according to the present embodiment.

FIG. 3 is a bottom perspective view illustrating a state in which a sealing member is inserted into a housing part according to the present embodiment.

FIG. 4 is a perspective view illustrating a state in which a female connector is coupled to a busbar unit for a hybrid vehicle according to the present embodiment.

FIG. 5 is a perspective view illustrating a contact terminal part according to the present embodiment.

FIG. 6 is a view illustrating a state in which a connector part and a grounding bracket are coupled to each other in a housing part according to the present embodiment.

FIG. 7 is a perspective view of a grounding bracket according to the present embodiment.

FIG. 8 is a cross-sectional view illustrating a state in which a grounding bracket according to the present embodiment is coupled between a motor cover and a housing part as an example.

FIG. 9 is a view illustrating a state in which a contact terminal part is fixed by a coupling member according to the present embodiment.

MODE FOR INVENTION

A busbar unit for a hybrid vehicle according to the present embodiment will be described with reference to the drawings.

Referring to the accompanying FIGS. 1 to 5, the disclosed busbar unit for a hybrid vehicle may be assembled without using a vibration welding method when coupling a connector portion 300 by molding a housing part 100 integrally in an injection method. As a result, the additional work of workers is reduced, the assembly work is simplified, and the assembly with the contact terminal part 200 and the connector part 300 is facilitated, thereby improving convenience. In addition, electrical grounding force and noise generation are prevented through the deformed grounding bracket 500.

To this end, the present embodiment comprises an integrally formed housing part 100, a plurality of contact terminal parts 200 which is installed at an inner side of the housing part 100, a connector part 300 which is coupled to a front surface of the housing part 100 to be electrically connected to the contact terminal parts 200, a coupling member 400 which is coupled to the connector part 300 via the contact terminal parts 200 at a lower side of the housing part 100, and a grounding bracket 500 including one end fixed to a front surface of the connector part 300 and the other end extending toward a seating surface 12 for electrical grounding to the seating surface 12 of a motor cover 10 where a bottom of the housing part 100 is seated.

Since the housing part 100 is made of a single housing unlike the prior art, it is possible to manufacture the upper housing (not shown) and the lower housing (not shown) without vibration welding as in the prior art, so the assembly process of workers can be simplified, and assembly work can be stably performed because there is no problem of product deformation due to welding.

The housing part 100 according to the present embodiment is injection molded in a closed state except for the front surface facing the connector part 300 and the lower side facing the direction of gravity.

When the housing part 100 is injection-molded in this way, the number of man-hours of workers is reduced, deformation of the housing part 100 is prevented, and the coupling between the contact terminal part 200 and the connector part 300 is changed more conveniently.

Since an insertion portion 102 with an open lower side is formed in the housing part 100 and an upper side is maintained in a closed state, the worker can perform the fixing to the contact terminal part 200, which will be described later, without performing additional work using the vibration welding to couple the housing part 100 and the connector part 300. Accordingly, the man-hours of worker are reduced and the work efficiency is improved.

The housing part 100 includes a housing contact portion 104 formed on the edge of the bottom surface, facing and making surface contact with the seating surface 12 formed along the edge of the upper surface of the motor cover 10.

The housing contact portion 104 includes a sealing groove portion 104a into which the sealing member (S) provided for sealing with the motor cover 10 is inserted and a ground groove portion 104b stepped inward to allow the other end of the grounding bracket 500 to be inserted, which are formed on the front lower side of the housing part 100.

When viewing the housing part 100 from the front surface, the lower side of the insertion portion 102 is opened and corresponds to a space communicating with the inside, and the worker may couple the coupling member 400 to be described later to the connector part 300 via the contact terminal part 200 through the insertion portion 102, thereby more easily performing the assembly.

When the sealing member (S) is inserted into the sealing groove portion 104a, sealing can be achieved when the motor cover 10 and the housing part 100 are coupled to each other, thereby blocking the inflow of foreign substances from the outside and maintaining the stable sealing.

The ground groove portion 104b is formed with a predetermined width (W), horizontal length (D), and height (H) when viewing the housing part 100 from the bottom, and in this embodiment, for example, the length in the width direction extends longer than the width or height, and a more detailed description will be provided while explaining the grounding bracket 500.

The contact terminal part 200 according to the present embodiment includes a plurality of first contact terminals 210 which is electrically contacted with the connector part 300, a plurality of second contact terminals 220 which is bent and extended from the plurality of first contact terminals 210 toward the lower side of the housing part 100 a plurality of times and is positioned inside the motor cover 10, and a plurality of nuts 230 which is integrally formed with the plurality of first contact terminals 210 and has a tap hole screwed into the coupling member 400.

The first contact terminal 210 is provided for contact with the connector part 300, and the second contact terminal 220 is provided for electrical connection inside the motor cover 10.

In the contact terminal part 200, a first insulator for electrical insulation is formed between the first contact terminal 210 and the second contact terminal 220 by an insert injection method, so that insulation may be achieved.

The first insulator is provided in both left and right mounting parts into which screws are inserted so as to be mounted inside the housing part 100, thereby enabling easy installation.

The nut 230 may be molded into the first contact terminal 210 by an insert injection method. For example, the second insulator 202 is integrally molded on the upper surface of the first contact terminal 210, and the nut 230 is formed in a dispositional relationship to be positioned on the upper surface of the second insulator 202.

In this way, when the nut 230 and the second insulator 202 are molded by insert injection molding, manufacturing is easy and insulation performance is improved, so problems caused by electrical short circuits or short circuits can be prevented.

When the connector part 300 is coupled, the second insulator 202 limits direct contact with the connector part 300 at locations other than the first contact terminal 210 to stably maintain electrical insulation, so that operational safety and insulation performance can be improved.

The nut 230 has a screw thread formed on the inside so that the coupling member 400 is coupled in a screw coupling method, so that they are coupled to each other, and each is formed on the plurality of first contact terminals 210, so that independently electrically connected state is maintained.

The connector part 300 according to the present embodiment includes a connector terminal portion 310 which extends a predetermined length toward the outside of a connector body 302 constituting the overall appearance, and a bolting hole 302a which is formed at a corner position of the connector body 302.

The connector body 302 is provided with a connector terminal portion 310 protruding toward the housing part 100 based on the drawing, and a connecting hole 312 is formed so that the coupling member 400 is inserted into the connecting terminal portion 310.

The bolting hole 302a is formed at the position illustrated in the drawing to be coupled to the housing part 100, and the connector part 300 may be fixed to the housing part 100 by a separately provided screw.

After the connector part 300 is installed in the housing part 100, a female connector 600 is coupled at the rear of the connector part 300 to make an electrical connection.

The grounding bracket according to the present embodiment will be described with reference to the drawings.

Referring to the accompanying FIGS. 6 to 9, the grounding bracket 500 has to be electromagnetically connected to the housing part 100 and the motor cover 10.

The reason why the grounding bracket 500 is used is to prevent residual electrons remaining in the circuit from generating noise during actual operation, and is used to induce noise to be reduced after being transferred to the grounding bracket 500.

Since noise is generated less as the grounding area of the grounding bracket 500 is wider, the ground bracket 500 is formed as illustrated in the drawing, but may be changed into other forms.

For example, the grounding bracket 500 according to the present embodiment includes a front portion 510 which is positioned at the center of the front surface of the housing part 100, a branching portion 520 which is branched from the front portion 510 to both left and right sides toward the front surface of the connector part 300, and a bent portion 530 which is bent from the front portion 510 toward the ground groove portion 104b of the housing part 100.

The front portion 510 has the widest ground area and remains inserted into the hook formed in the housing part 100. After the branching portion 520 extends from the upper side to both left and right sides along the surface of the housing part 100, it extends to the bolting hole 302a and is fixed by screws.

The branching portion 520 is extended in the form illustrated in the drawing in order to increase the grounding area together with the front portion 510, but may be changed in other forms.

Since the front portion 510 has relatively wider width and area than those of the branch portion 520, it is more advantageous for the movement of remaining electrons.

The bent portion 530 extends obliquely downward toward the seating surface 12 at the lower end of the front portion 510, and when in surface contact with the seating surface 12, a predetermined tension is applied to the seating surface 12, and thus, the contact state is maintained.

When the bent portion 530 is coupled to the seating surface 12 of the motor cover 10 in a state where the tension is maintained in such an inclined state, it can be coupled to increase the adhesion with the seating surface 12. Accordingly, the transmission rate due to noise generation is improved, the grounding area is not reduced, and the coupling between the housing part 100 and the motor cover 10 is improved.

When the bent portion 530 is bent at a right angle, the tension due to assembly is relatively reduced compared to when it is inclined. However, when the bent portion 530 is bent obliquely as in the present embodiment, a tension force is applied in the lower direction (direction A) toward the seating surface 12 at the same time as assembly, and the tension force is applied toward the inner upper surface (direction B) of the ground groove portion 104b at the same time, thereby improving the grounding force.

Therefore, the bent portion 530 is grounded with the seating surface 12 in a state in which the surface pressure due to the predetermined tension is maintained in the ground groove portion 104b, so that the remaining electrons can move more smoothly when noise is generated, which is more effective in reducing noise.

In the busbar unit according to the present embodiment, in the state where the insertion portion 102 of the housing part 100 is positioned vertically upward, in a state in which the connector terminal portion 310 provided in the connector part 300 is in surface contact with one surface of the plurality of first contact terminals 210, the coupling member 400 is inserted into the nut 230 through the inside from the upper side of the insertion portion 102 in the direction of the arrow.

When the coupling member 400 is screwed to the nut 230, the housing part 100 and the connector part 300 are easily coupled to each other.

The worker flips the insertion portion 102 of the housing part 100 coupled with the connector part 300 to face the lower side, which is the ground, and then places the housing part 100 on the seating surface 12 of the motor cover 10, and assembles using bolts (not shown) provided separately to couple the housing part 100 to the motor cover 10 on the upper side of the housing part 100, thereby completing the installation.

Although the embodiments of the present invention have been described above, it should be noted that one of ordinary skill in the art may make a variety of modifications and changes of the present invention by adding, changing, deleting, inserting, or the like of components without departing from the concept of the present invention which is disclosed in the claims and this will be included within the scope of the present invention.

DESCRIPTION OF REFERENCE NUMERALS

100: housing part
102: insertion portion
200: contact terminal part
210, 220: first, second contact terminals
230: nut
300: connector part
400: coupling member
500: grounding bracket
510, 520, 530: front portion, branching portion, bent portion

The invention claimed is:

1. A busbar unit for a hybrid vehicle comprising:
an integrally formed housing part;
a plurality of contact terminal parts which is installed at an inner side of the housing part;
a connector part which is coupled to a front surface of the housing part to be electrically connected to the contact terminal parts;
a coupling member which is coupled to the connector part via the contact terminal parts at a lower side of the housing part; and
a grounding bracket including a first end fixed to a front surface of the connector part and a second end extending toward a seating surface for electrical grounding to the seating surface of a motor cover where a bottom surface of the housing part is seated; wherein the housing part includes an insertion portion with an open lower side and a housing contact portion which faces and makes surface contact with the seating surface along an edge of the insertion portion, and wherein the housing contact portion includes a sealing groove portion into which a sealing member provided for sealing with the motor cover is inserted and a ground groove portion stepped inward to allow the second end of the grounding bracket to be inserted.

2. The busbar unit of claim 1, wherein the ground groove portion extends a predetermined length along a horizontal direction of the housing part.

3. The busbar unit of claim 1, wherein the contact terminal part includes:
a plurality of first contact terminals which are electrically contacted with the connector part;
a plurality of second contact terminals which are bent and extended from the plurality of first contact terminals toward the lower side of the housing part a plurality of times and are positioned inside the motor cover; and
a plurality of nuts which are integrally formed with the plurality of first contact terminals and have a tap hole into which the coupling member is screwed.

4. The busbar unit of claim 1, wherein the connector part includes a connector terminal portion which extends a predetermined length toward an outside of a connector body of the connector part.

5. The busbar unit of claim 4, wherein the grounding bracket includes:
a front portion which is positioned at a center of the front surface of the housing part;
a branching portion which is branched from the front portion to both left and right sides toward the front surface of the connector part; and
a bent portion which is bent from the front portion toward the housing part.

6. The busbar unit of claim 5, wherein the front portion has relatively wider width and area than those of the branching portion.

7. The busbar unit of claim 6, wherein an end of the bent portion extends obliquely downward toward the seating surface, and when the bent portion is in surface contact with the seating surface, a predetermined tension is applied to the seating surface, thereby maintaining a contact state.

8. The busbar unit of claim 1, wherein in a state where the insertion portion of the housing part is positioned vertically upward, the coupling member is coupled in a direction from an upper side to an lower side.

* * * * *